United States Patent [19]

Nels et al.

[11] Patent Number: 4,639,392

[45] Date of Patent: Jan. 27, 1987

[54] CLUTCH PLATE MEMBER HAVING LAYER OF HIGH DURABILITY, SELF-CONFORMING FRICTION FACING

[75] Inventors: Terry E. Nels, Xenia; Larry Eldridge, Dayton; Gerald L. Doty, Miamisburg, all of Ohio

[73] Assignee: General Motors Corporation, Detroit, Mich.

[21] Appl. No.: 792,110

[22] Filed: Oct. 28, 1985

[51] Int. Cl.$^4$ ............................................. B32B 5/16
[52] U.S. Cl. ................................... 428/283; 428/285; 428/323; 428/408; 428/457
[58] Field of Search ............... 428/280, 281, 282, 283, 428/284, 285, 323, 248, 408, 457

[56] References Cited

U.S. PATENT DOCUMENTS 3,316,138 4/1967 Taylor ................................. 156/267
3,927,241 12/1975 Augustin ............................. 428/408
4,146,527 3/1979 Yamamoto et al. ................. 260/38

FOREIGN PATENT DOCUMENTS 1525334 9/1971 Fed. Rep. of Germany .
1451864 10/1976 United Kingdom .

Primary Examiner—James J. Bell
Attorney, Agent, or Firm—Randy W. Tung

[57] ABSTRACT

A clutch plate member for operating in a fluid medium to transmit torque to a metal mating surface situated on an opposing clutch plate member in a wide range of slip speeds. The clutch plate member is constructed of a friction facing layer consisting of thermoset resin bonded carbon particles bonded to a compliant carrier sheet which is in turn bonded to a metal support plate. The compliant carrier sheet improves the conformability of the friction facing layer to the metal mating surface resulting in a reduction in the maximum operating temperature of the friction facing layer.

6 Claims, 3 Drawing Figures

CLUTCH PLATE MEMBER HAVING LAYER OF HIGH DURABILITY, SELF-CONFORMING FRICTION FACING

FIELD OF THE INVENTION

The present invention relates to a clutch plate member used in an automotive transmission and, more particularly, is concerned with a clutch plate member used in an automotive transmission which has a high durability, self-conforming friction material layer consisting of carbon and phenolic particles bonded to a compliant carrier sheet.

BACKGROUND OF THE INVENTION

Clutch plate members of the type described in the present invention are used extensively in automotive transmissions utilizing a fluid medium. When used in an automotive transmission as the driving member, a clutch plate member compresses and engages a driven member to drive the vehicle when pressure is applied to it. To increase the fuel economy of a vehicle, it is desirable to have the clutch plate members engaged over a wide range of slip speed (engine and transmission speed differential). It is therefore an important consideration when designing a clutch plate member to use a friction material which can be efficiently operated at a lower operating temperature over a wide range of slip speed. This lower operating temperature leads to a more durable clutch plate member having a longer service life.

Another important consideration in the design of a clutch plate member is that the frictional property of the material should remain approximately constant over the wide range of slip speed that the clutch plate member operates in order to minimize the transmission shudder phenomenon. Transmission shudder usually occurs at the friction interface where the static or low speed coefficient of friction is higher than the dynamic or high speed coefficient of friction. This condition causes the clutch to operate in a so-called stick slip mode which in turn translates into the transmission shudder phenomenon.

A variety of friction materials have been used to construct the friction facing layer of an automotive clutch plate member. Most of these traditional friction materials can be categorized into two types. The first type is a highly porous fibrous material made first by traditional paper making technology and then saturated with a thermoset plastic binder such as phenolic or epoxy. This type of material provides good conformability with a rigid mating surface due to its high compressibility. However, they typically have only a medium internal strength and a medium heat resistance therefore limiting their use to medium duty transmission applications. Materials of this type are described in U.S. Pat. No. 3,316,138 to Taylor and Almen et al U.S. Pat. No. 2,733,797, both assigned to the assignee of the present invention.

The second traditional type of friction material is a highly rigid material composed of grannular or fibrous carbon or other similar materials bonded together by a thermoset type of plastic resin or a metallic brazing material. These materials have very high internal strength and high energy absorbing capacity. However, they have the inherent drawback of poor conformability to a mating surface due to their rigidity. This poor conformability leads to hot spot formation in the friction material which in turn causes higher overall operating temperature of the clutch plate member. It is believed that higher operating temperatures cause premature failure of the friction facing layer and consequently a short service life. Materials of this type are disclosed in Yamamoto et al U.S. Pat. No. 4,146,527 and German Patent Application No. 1-525-334.

It is therefore an object of the present invention to provide a clutch plate member having a friction facing layer that offers both the conformability of a porous fibrous material and the strength and energy absorbing capacity of a hard grannular material.

It is another object of the present invention to provide a clutch plate member having a friction facing layer of high conformability, high strength, and energy absorbing capacity, and can be manufactured in a continuous process at low cost.

SUMMARY OF THE INVENTION

Our novel invention is a new clutch plate member design consisting of a friction facing layer bonded to a rigid metal plate by a layer of adhesive. Our invention offers the conformability of a traditional porous fibrous material and yet the strength and energy absorbing capability of a rigid grannular material. Our novel clutch plate member is constructed in the following manner. A compliant carrier sheet of porous fibrous nature having high conformability and compressive strength is coated with a grannular mixture of carbon and a phenolic thermoset binder to form a friction facing layer. This friction facing layer may be produced in a continuous process at low manufacturing cost. The surface of the compliant carrier sheet opposite to the friction material coating is then fastened to a rigid metal plate by adhesive means to form a clutch plate member.

BRIEF DESCRIPTION OF THE DRAWINGS

Other objects, features and advantages of the present invention will become apparent upon consideration of the specification and the appended drawings in which.

DETAILED DESCRIPTION OF A PREFERRED EMBODIMENT

Figure 1:
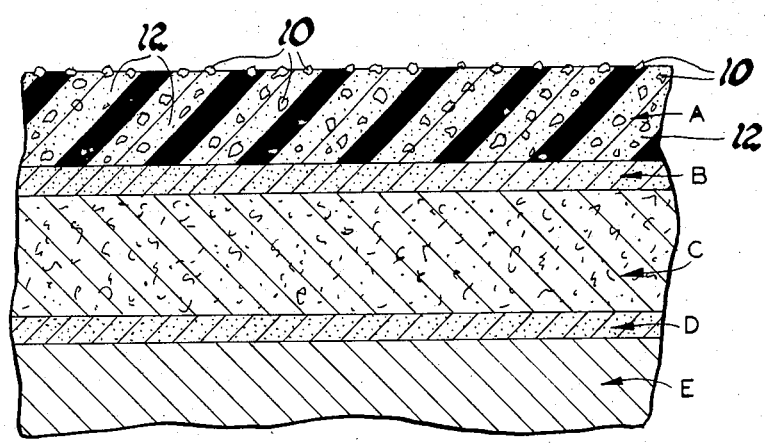
FIG. 1 is a cross-sectional view of a clutch plate member embodying the present invention.

Referring initially to FIG. 1, a cross-sectional view of a clutch plate member embodying the present invention is shown. Layer A composed of carbon particles 10 and phenolic powder 12 compression molded together onto layer C, a compliant carrier sheet with a layer B of adhesive in between. Layers A, B and C form the friction facing layer when compression molded together. The carbon particles 10 used in this invention is a petroleum-coke based carbon generally of spherical shape. The diameters of the particles are approximately within the 0.002 to 0.006 inch range. This type of carbon particles is commercially available from suppliers such as Asbury Graphite Mills, Inc. The phenolic powder used in the present invention is an epoxy modified phenolic obtained from Schenectady Chemicals Co., grade HRJ 1797. The powder was characterized by screen analysis to be zero percent of +40 mesh and 96 percent minimum of −200 mesh. It has a cure temperature of 135 degrees centigrade and contains 1½ percent maximum ash content. The carbon particles and the phenolic powder are mixed together in a suitable container at a weight percent ratio of 60 to 85 percent carbon and 15 to 40 percent phenolic.

The compliant carrier sheet used in the present invention is a friction paper composed primarily of cellulose fibers saturated with a liquid phenolic resin. The friction paper also contains small amounts of diatomaceous earth particles and other friction modifiers. It has a compressive modulus in the range of 5,000 to 10,000 psi. It typically contains 35–65 percent porosity which provides high compliance and absorption of oil to keep the paper cool and lubricated during operation of the clutch plate member. A commercial source for this type of friction paper is Fabricon Automotive Products. We have found a suitable thickness to be used is 0.035 inch. Other suitable materials having similar properties may also be used as the compliant carrier sheet. For instance, we have successfully used sheets of epichlorohydrin rubber having a Shore A durometer hardness of 35.

The friction facing layer which consists of the friction material layer A, an adhesive layer B, and a compliant carrier sheet C (FIG. 1) is assembled to a metal substrate plate, layer E, by using a second solid film adhesive layer D. We have found a suitable solid film adhesive to be used in this invention is a nitrile phenolic based adhesive film supplied by Morgan Adhesive Company. We have also found that a suitable thickness of the solid adhesive film to be used is between 0.001 to 0.002 inch. This solid adhesive film becomes tacky when heated to 200 degrees fahrenheit.

Although solid film adhesive was used in the present invention, anyone skilled in the art should be able to use other fastening means equally well to practice the current invention. For instance, various kinds of sprayed-on adhesive or even some mechanical means may be utilized to assemble the friction facing layer to the metal substrate plate.

The clutch plate member embodying the present invention may be assembled by, but not limited to, the following two examples.

EXAMPLE 1

Carbon particles are first blended with 15 to 40 weight percent epoxy modified phenolic resin powder. A layer of solid film adhesive is placed on top of a carrier paper situated in a fixture for level fill of powder mixture. The blended carbon particles/epoxy modified phenolic powder is then level filled on top of the carrier paper to a depth of 0.030 inch. The fixture is first transferred to an oven set at 275 degrees fahrenheit for 20 seconds to heat set the powder mixture. It is then transferred to a hot platen press heated to 450 degrees fahrenheit and pressed under 300 psi pressure for 15 seconds to bond the friction material layer to the carrier paper.

A second layer of solid film adhesive is then tacked to the surface of the carrier paper opposite to the surface containing the friction material. A friction facing layer of desirable shape can now be blanked out of the laminated sheet and bonded to a metal substrate plate. We have found a pressure of approximately 500 pounds per square inch is adequate for this bonding operation.

This method is suitable for either making samples in the laboratory or for a production process.

EXAMPLE 2

A slurry process is utilized in this method. First, carbon particles between 40 to 50 weight percent are blended with 50 to 60 weight percent liquid phenolic resin obtained from Ashland Chemical Company, AROFENE ® 295-E15. This slurry is then spread out by rollers on a continuous roll of adhesive film coated friction paper to a thickness of approximately 0.030 inch. The coated friction paper is then fed into a series of ovens set at 250 degrees fahrenheit on a conveyor belt for a total heating time of 15 minutes. It is then pressed in a series of pressure rollers at 1000 pounds per square inch pressure at 450 degrees fahrenheit for a total time of 1 minute. Desirable shapes of the friction facing layer are then punched out from the roll and bonded to metal substrate plates to make clutch plate members. This slurry process is a continuous process and can be completely automated to produce low cost clutch plate members.

Figure 2:
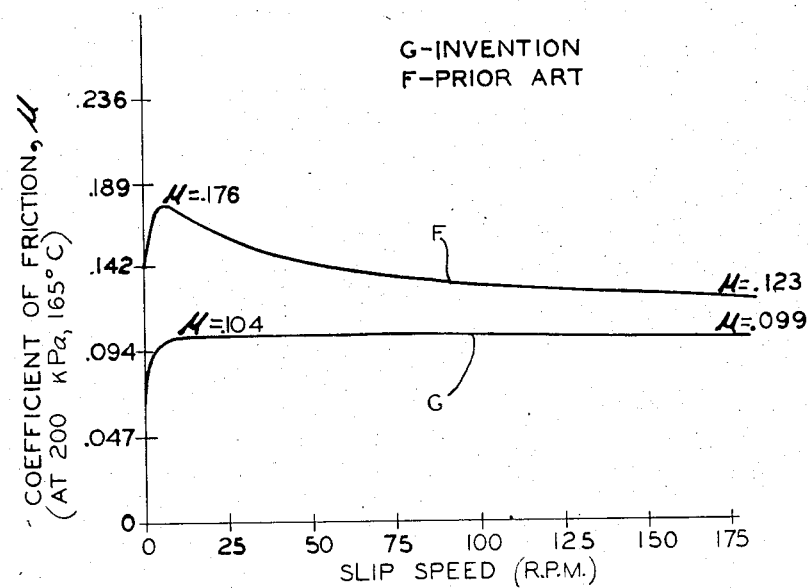
FIG. 2 is a graph showing the coefficient of friction data of a friction facing layer at various slip speed obtained on a clutch plate member embodying the present invention when compared to the same for a prior art clutch plate member having a porous fibrous material as its friction facing layer.
Figure 3:
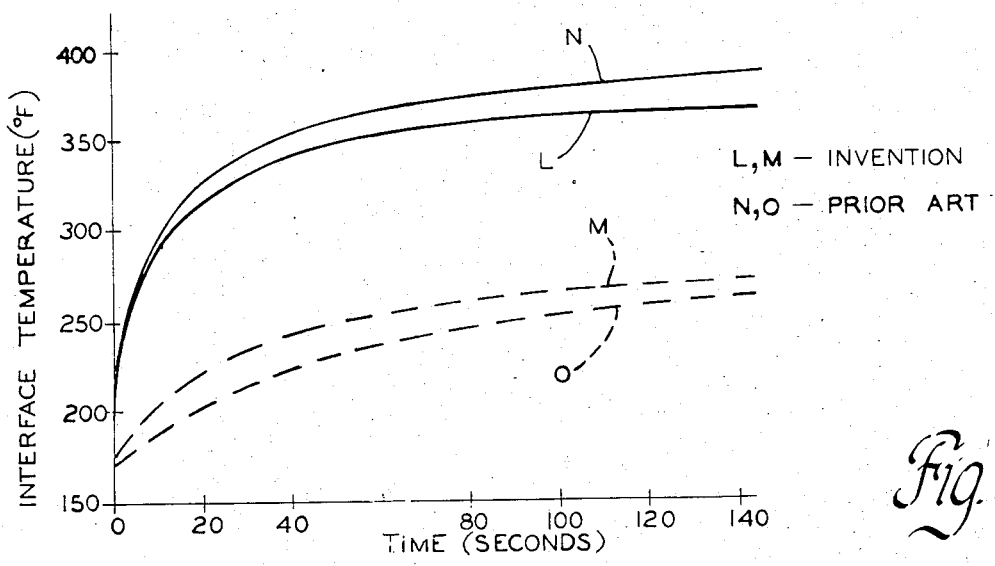
FIG. 3 is a graph showing the temperature data obtained at the interface between the friction material on a driving clutch plate member and a flat metal surface on a driven clutch plate member plotted against time for a clutch plate member embodying the present invention and a prior art clutch plate member.

The advantages of the present invention over the prior art are shown in FIGS. 2 and 3. FIG. 2 is a graph of coefficient of friction data plotted against a range of slip speed between 0 to 175 rounds per minute. Curve G represents data obtained on a friction facing layer made by bonding carbon particles/phenolic powder to a compliant carrier sheet. Curve F represents data obtained on a prior art porous fibrous sheet without the carbon particles/phenolic powder layer. It is seen that for the friction facing layer embodying the present invention, curve G, the coefficient of friction remains essentially constant throughout a wide range of slip speed between 10 to 175 rounds per minute. In contrast, the coefficient of friction of the prior art friction facing layer decreases by approximately 35 percent within the same range of slip speed.

The essentially constant coefficient of friction of the clutch plate member embodying the present invention over the wide range of slip speed eliminates the transmission shudder phenomenon almost completely. The drivability of the automobile is greatly improved because of the elimination of shudder.

FIG. 3 shows the benefit obtained when a compliant carrier sheet is used between the carbon particles/phenolic resin layer and the metal substrate plate. The temperature at the interface between friction material on a driving clutch plate member and the mating metal surface on a driven clutch plate member is recorded against time in FIG. 3. Curves L and M represent data obtained on the clutch plate member embodying the present invention, L and M denote data obtained at the high spot and low spot of the interface respectively. Curves N and O represent data obtained on a prior art clutch plate member where no compliant carrier sheet was used, N and 0 denote data obtained at the high spot and low spot of the interface respectively. The high spot temperature at the interface is also referred to as the maximum operating temperature of the friction facing layer.

It is seen when curves L and N are compared that the high spot temperature of a clutch plate member having a compliant carrier sheet are approximately 25 degrees fahrenheit lower than that obtained on a clutch plate member without the carrier sheet. A reduction in the high spot temperature, or the maximum operating temperature, of approximately 7% is achieved. It should be noted here that it is desirable in the design of transmission clutch plate members to have the lowest possible high spot temperature. This is to avoid the degradation of the fluid medium contained in the transmission and the phenolic resin contained in the friction material. It is advantageous to have a lower high spot temperature in order to provide a clutch plate member of high durability and long service life.

The low spot temperatures, represented by curves M and O in FIG. 3, also show the advantages achieved by the present invention. The low spot temperature data obtained on the clutch plate member embodying the present invention is approximately 25 degrees higher than that obtained on the prior art clutch plate member. This is a desirable result since it indicates that in the clutch plate member embodying the present invention the temperature gradient on the friction facing surface is smaller than that on the prior art clutch plate member. It is believed that a more uniform temperature distribution on the friction facing surface helps to eliminate the formation of hot spots. Since hot spots reduce the durability of the friction facing layer, an overall lower operating temperature resulting from a lower and more uniform temperature profile across the friction facing surface improves the service life of the clutch plate member.

The achievement of lower operating temperature in the friction facing layer by the present invention can be explained as follows. First, it is recognized that the two mating surfaces, i.e., the metal surface on a driven clutch plate member and the surface of the friction material layer, are both very rigid. It is further recognized that the two rigid mating surfaces are never perfectly flat, i.e., there is always waviness or taper present. A highly compressible compliant carrier sheet paper placed in between the metal substrate plate and the friction material layer on the driving clutch plate member improves the conformance between the two mating surfaces, i.e., surface on the driven clutch plate member and the surface of the friction material layer, when they are pressed against each other. Data (not shown here) indicated that contact area between the two mating surfaces achieved without the compliant carrier sheet is only approximately 30 percent of the total available area. The addition of a compliant carrier sheet in between the metal substrate plate and the friction material layer increases the contact area to approximately 70 percent. The contact between the two rigid mating surfaces when they are pressed against each other is significantly improved. This in turn enables an overall lower operating temperature in the friction material layer leading to a clutch plate member having improved durability and service life.

While our invention has been described in terms of a preferred embodiment thereof, it is to be appreciated that those skilled in the art will readily apply these teachings to other possible variations of the invention.

The embodiments of the invention in which an exclusive property or privilege is claimed are defined as follows:

1. A clutch plate member for operating in a fluid medium to transmit torque to a metal mating surface situated on an opposing clutch plate member in a wide range of slip speeds, said clutch plate member comprising a friction facing layer consisting of thermoset resin bonded carbon particles bonded to a compliant carrier sheet which is in turn bonded to a metal support plate, said compliant carrier sheet improving the conformability of said friction facing layer to said metal mating surface resulting in a reduction in the maximum operating temperature of said friction facing layer by at least five percent.

2. A clutch plate member for operating in a fluid medium to transmit torque to a metal mating surface situated on an exposing clutch plate member in a wide range of slip speeds, said clutch plate member comprising a friction facing layer consisting of thermoset resin bonded carbon particles having diameters in the range of 0.002 to 0.006 inch bonded to a compliant carrier sheet having a minimum thickness of 0.01 inch and a maximum compressive modulus of 20,000 pounds per square inch which is in turn bonded to a metal substrate plate by adhesive means, whereby said compliant carrier sheet improves the conformability of said friction facing layer to said metal mating surface resulting in a reduction in the maximum operating temperature of said friction facing layer by at least five percent.

3. A clutch plate member for operating in a fluid medium to transmit torque to a metal mating surface situated on an opposing clutch plate member in a range of slip speeds between 0 to 175 revolutions per minute, said clutch plate member comprising:
   (a) a layer of friction material consisting of thermoset resin bonded carbon particles having diameters in the range of 0.002 to 0.006 inch, said friction material containing between 60 to 85 weight percent carbon particles and between 15 to 40 weight percent thermoset resin;
   (b) a compliant carrier sheet;
   (c) a metal support plate of sufficient stiffness to which said compliant carrier sheet is bonded to by adhesive means, whereby said compliant carrier sheet improves the conformability of said friction material layer to said metal mating surface resulting in a reduction in the maximum operating temperature of said friction facing layer by at least five percent.

4. A clutch plate member as described in claim 3 wherein the compliant carrier sheet is a friction paper composed primarily of cellulose fibers.

5. A clutch plate member as described in claim 3 wherein the compliant carrier sheet is composed primarily of elastomeric material.

6. A clutch plate member as described in claim 3 wherein the thermoset resin is an epoxy modified phenolic resin.

* * * * *